(12) United States Patent
Meessen et al.

(10) Patent No.: US 8,338,343 B2
(45) Date of Patent: Dec. 25, 2012

(54) ADDITIVE COMPOSITION COMPRISING AN AMIDIZED OR IMIDIZED POLYMER

(75) Inventors: Patric Meessen, La Calamine (BE);
Gerhard Van Vliet, CG Spaubeek (NL);
Gerardus Arnoldus Rademakers, GT Heerlen (NL); Johannes Hendrik Geesink, AR Schinnen (NL); Zhaoyao Joe Qiu, Baton Rouge, LA (US);
Franciscus Victoire Paulus Houtvast, BX Nuth (NL)

(73) Assignee: Lanxess Elastomers B.V., Geleen (NL)

( * ) Notice: Subject to any disclaimer, the term of this patent is extended or adjusted under 35 U.S.C. 154(b) by 712 days.

(21) Appl. No.: 11/921,858

(22) PCT Filed: Jun. 8, 2006

(86) PCT No.: PCT/EP2006/005482
§ 371 (c)(1),
(2), (4) Date: Nov. 4, 2009

(87) PCT Pub. No.: WO2006/133848
PCT Pub. Date: Dec. 21, 2006

(65) Prior Publication Data
US 2010/0113315 A1    May 6, 2010

(30) Foreign Application Priority Data
Jun. 13, 2005 (EP) .................... 05076382

(51) Int. Cl.
*C10M 149/04* (2006.01)
*C08F 255/00* (2006.01)
*C08F 255/02* (2006.01)

(52) U.S. Cl. .......... 508/291; 508/459; 508/221; 525/69; 525/242; 525/285; 525/301

(58) Field of Classification Search ................ 508/452, 508/291, 459, 221; 525/69, 242, 285, 301
See application file for complete search history.

(56) References Cited

U.S. PATENT DOCUMENTS
5,427,702 A    6/1995   Chung et al.
(Continued)

FOREIGN PATENT DOCUMENTS
EP    0 338 672    10/1989
(Continued)

OTHER PUBLICATIONS
International Search Report for PCT/EP2006/005482 mailed Jun. 10, 2006.
(Continued)

*Primary Examiner* — Jim Goloboy
(74) *Attorney, Agent, or Firm* — Nixon & Vanderhye P.C.

(57) ABSTRACT

The invention relates to a process for an additive composition comprising an amidized or imidized polymer. The invention further relates to a highly grafted, multi-functional lubricant additive useful to improve the viscosity index and dispersancy properties of a lubricating oil composition. The present invention also relates to a method of extending lubricant drain intervals and improving fuel economy and fuel economy durability. The additive composition is prepared by: (A) reacting an olefin copolymer of ethylene and at least one C3 to C23 &agr; -olefin comprising from about 15 to 80 mole percent of ethylene, from about 20 to 85 mole percent of said C3 to C23 &agr; -olefin and from about 0 to 15 wt percent of a polyene, said copolymer having a number average molecular weight ranging from 1,000 to 500,000, with an olefinic carboxylic acid acylating agent, said process comprising heating said polymer to a molten condition at a temperature in the range of 60° C. to 240° C., grafting, in a first extruder or a first mixing device, said olefinic carboxylic acylating agent onto said copolymer, optionally subsequently reducing the molecular weight of said copolymer at a temperature in the range of 250° C. to 350° C., thereby producing a grafted, reduced molecular weight acylated copolymer having a number average molecular weight ranging from 1,000 to 80,000 and having at least 0.2-20 molecules of said carboxylic acid acylating agent grafted per 1000 C atoms of said olefin copolymer, and (B) reacting, in a second extruder or a second mixing device, said acylated copolymer made in (A) with a polyamine.

21 Claims, 1 Drawing Sheet

U.S. PATENT DOCUMENTS

| | | | |
|---|---|---|---|
| 5,439,981 A * | 8/1995 | Balzer et al. | 508/242 |
| 5,474,694 A * | 12/1995 | Shirodkar et al. | 508/221 |
| 5,552,096 A | 9/1996 | Auda et al. | |
| 2006/0173135 A1 * | 8/2006 | Devlin et al. | 525/242 |

FOREIGN PATENT DOCUMENTS

| EP | 0 491 456 | | 6/1992 |
|---|---|---|---|
| EP | 0 604 319 | | 6/1994 |
| EP | 728767 | A1 * | 8/1996 |
| EP | 0 909 805 | | 4/1999 |
| EP | 0 922 752 | | 6/1999 |
| WO | 2006/048328 | | 5/2006 |

OTHER PUBLICATIONS

International Preliminary Report on Patentability dated Sep. 21, 2007.

* cited by examiner

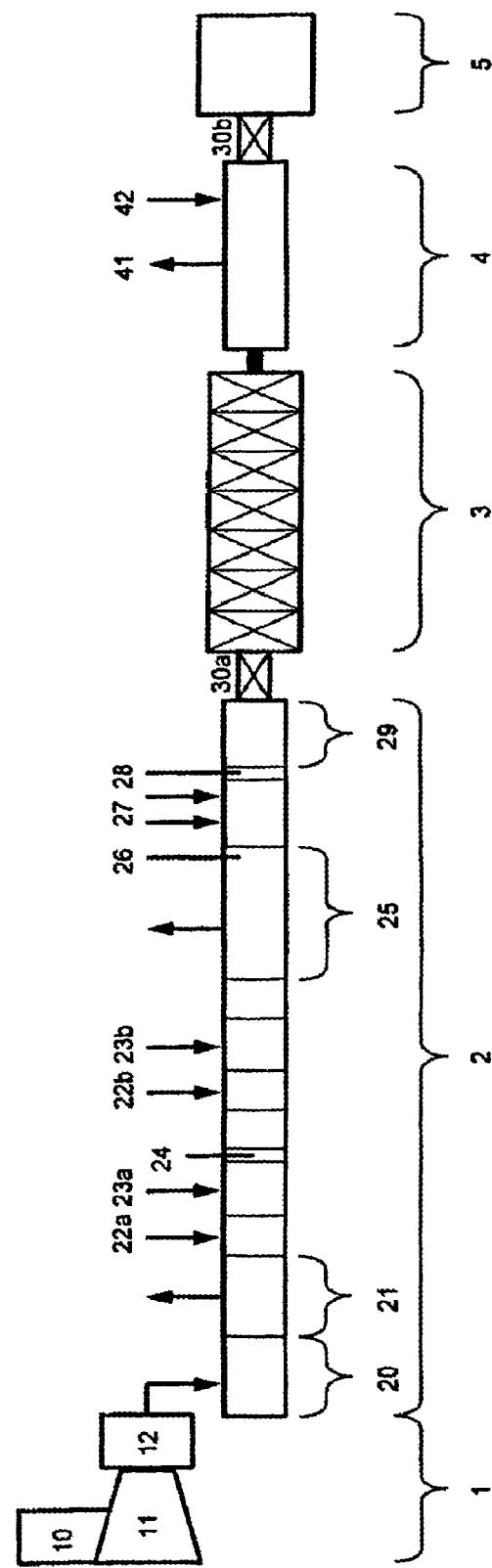

US 8,338,343 B2

ADDITIVE COMPOSITION COMPRISING AN AMIDIZED OR IMIDIZED POLYMER

This application is the U.S. national phase of International Application No. PCT/EP2006/005482 filed 8 Jun. 2006 which designated the U.S. and claims priority to EP 05076382.0 filed 13 Jun. 2005, the entire contents of each of which are hereby incorporated by reference.

TECHNICAL FIELD

This invention relates to a process for the preparation of a functional polymer, an additive composition, and in particular to a process for the preparation of an additive composition comprising an amidized or imidized polymer. The invention further relates to a highly grafted, multi-functional lubricant additive useful to improve the viscosity index and dispersancy properties of a lubricating oil composition. The present invention also relates to a method of extending lubricant drain intervals and improving fuel economy and fuel economy durability.

The art contains many disclosures on the preparation of polymer additives in lubricating oil compositions. Ethylene-propylene copolymers and ethylene alpha-olefin non-conjugated diene terpolymers which have been further derivatized to provide bifunctional properties in lubricating oil compositions illustrate this type of oil additive.

U.S. Pat. No. 4,089,794 discloses ethylene copolymers derived from ethylene and one or more $C_3$ to $C_{28}$ alpha olefin solution grafted with an ethylenically-unsaturated carboxylic acid material followed by a reaction with a polyfunctional material reactive with carboxyl groups, such as a polyamine, a polyol, or a hydroxyamine, which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,146,489 discloses a graft copolymer where the backbone polymer is an oil-soluble ethylene-propylene copolymer or an ethylene-propylene-diene modified terpolymer with a graft monomer of C-vinylpyridine or N-vinylpyrrolidone to provide a dispersant VI improver for lubricating oils.

U.S. Pat. No. 4,320,019 discloses a multipurpose lubricating additive prepared by the reaction of an interpolymer of ethylene and a $C_3$-$C_8$ alpha-monoolefin with an olefinic carboxylic acid acylating agent to form an acylating reaction intermediate, which is then reacted with an amine.

U.S. Pat. No. 4,340,689 discloses a process for grafting a functional organic group onto an ethylene alpha-olefin copolymer or an ethylene-propylene-diene terpolymer.

U.S. Pat. No. 4,357,250 discloses a reaction product of a copolymer and an olefin carboxylic acid via the "ene" reaction followed by a reaction with a monoamine/polyamine mixture.

U.S. Pat. No. 4,382,007 discloses a dispersant VI improver prepared by reacting a polyamine-derived dispersant with an oxidized ethylene-propylene polymer or an ethylene-propylene-diene terpolymer.

U.S. Pat. No. 4,144,181 discloses polymer additives for fuels and lubricants comprising a grafted ethylene copolymer reacted with a polyamine, polyol or hydroxyamine and finally reacted with an alkaryl sulfonic acid.

WO 96/39477 teaches multi-grade lubricating oils comprising a low saturate base stock, less than three mass percent of an ashless dispersant and a viscosity modifier. The reference does not teach the highly grafted, multi-functional VI modifiers of the present invention.

WO 94/13763 discloses mixed ethylene/alpha-olefin copolymer multifunctional viscosity modifiers. The reference does not teach the highly grafted, multi-functional VI modifiers of the present invention.

U.S. Pat. No. 4,863,623 teaches multifunctional olefin copolymer VI improvers. This patent does not teach the functionality to molecular weight relationship of the highly grafted, multi-functional VI improvers of the present invention.

U.S. Pat. No. 5,075,383 discloses a process for preparing a dispersant and antioxidant olefin copolymer additives, wherein free-radical grafting is accompanied by the molecular weight reduction of the copolymers due to mechanical shearing.

U.S. Pat. No. 5,556,923 discloses oil solutions of adducted derivatized EPR or EPDM. This patent does not teach the functionality to molecular weight relationship of the highly grafted, multi-functional VI improvers of the present invention.

BACKGROUND OF THE INVENTION

A method for preparing a highly grafted multifunctional olefin copolymer is known from U.S. Pat. No. 6,107,257, which describes the grafting of an ethylenically unsaturated carboxylic acid material onto a copolymer prepared from ethylene and at least one $C_3$ to $C_{23}$ alpha-olefin and, optionally, a polyene, wherein an intermediate copolymer has grafted thereon from 0.3 to 0.75 carboxylic groups per 1000 number average molecular weight units of olefin copolymer. Next, the polymer intermediate is reacted with a polyamine compound, resulting in an imidized copolymer, wherein the copolymer has a number average molecular weight of between 20,000 and 150,000 g/mol.

A drawback of this known process for preparing a highly grafted multifunctional olefin copolymer is that it requires a low molecular weight polymer to start with.

Another drawback of this known process is that the conversion to the imidized polymer is not more than about 80%. This means that about 20% of the anhydride groups will not be converted to imide groups. In the presence of water, these anhydride groups will be partly or totally converted to acid groups. Another part of the anhydride groups may be converted to amides. Such low degree of conversion requires a higher content of polymer to obtain sufficient dispersancy properties of the oil, which deteriorates the low temperature viscosity of the oil.

An object of this invention is to provide a process for the preparation of a solid novel highly grafted, multi-functional olefin copolymer composition without the above-mentioned drawbacks.

Another object of the invention is to provide a highly grafted, multi-functional lubricant additive effective for imparting viscosity index, dispersancy and antioxidant properties to a lubricating oil composition, as well as enabling extended lubricant drain intervals and improving fuel economy and fuel economy durability.

A further object is to provide a novel lubricating oil composition containing the highly grafted, multi-functional olefin copolymer additive of the invention as well as to provide concentrates of the novel additive of the invention.

SUMMARY OF THE INVENTION

The novel process for the preparation of an additive composition comprises the following steps as described in claim 1. The novel lubricant compositions of the present invention comprise an oil of lubricating viscosity and an effective amount of the highly grafted, multi-functional olefin copolymer.

DETAILED DESCRIPTION OF THE INVENTION

The olefin copolymer employed in the novel, highly grafted, multi-functional olefin copolymer additive of the present invention may be prepared from ethylene and propylene or it may be prepared from ethylene and at least one higher olefin within the range of $C_3$ to $C_{23}$ alpha-olefins.

Preferred polymers for use in the present invention are copolymers of ethylene and one or more $C_3$ to $C_{23}$ alpha-olefins. Copolymers of ethylene and propylene are most preferred. Other alpha-olefins suitable in place of propylene to form the copolymer or to be used in combination with ethylene and propylene to form a terpolymer include 1-butene, 1-pentene, 1-hexene, 1-octene and styrene, branched chain alpha-olefins such as 4-methylbutene-1,5-methylpentene-1 and 6-methylheptene-1; and mixtures thereof.

More complex olefin copolymers, often designated as interpolymers, may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, 1,5-hexadiene, 1,6-heptadiene, 1,7-octadiene, dicyclopentadiene, 5-ethylidene-2-norbornene, 5-methylene-2-norbornene, 1,5-heptadiene, and 1,6-octadiene. A mixture of more than one diene can be used in the preparation of the interpolymer. A preferred non-conjugated diene for preparing a terpolymer or interpolymer substrate is 1,4-hexadiene.

The triene component will have at least two non-conjugated double bonds, and up to about 30 carbon atoms in the chain. Typical trienes useful in preparing the interpolymer of the invention are 1-isopropylidene-3α,4,7,7α-tetrahydroindene, 1-isopropylidenedicyclopentadiene, dihydro-isodicyclopentadiene, and 2-(2-methylene-4-methyl-3-pentenyl)[2.2.1]bicyclo-5-heptene.

Ethylene-propylene or higher alpha-olefin copolymers may consist of from about 15 to 80 mole percent ethylene and from about 85 to 20 mole percent $C_3$ to $C_{23}$ alpha-olefin with the preferred mole ratios being from about 35 to 75 mole percent ethylene and from about 65 to 25 mole percent of a $C_3$ to $C_{23}$ alpha-olefin, with the more preferred proportions being from 50 to 70 mole percent ethylene and 50 to 30 mole percent $C_3$ to $C_{23}$ alpha-olefin, and the most preferred proportions being from 55 to 65 mole percent ethylene and 45 to 35 mole percent $C_3$ to $C_{23}$ alpha-olefin.

Terpolymer variations of the foregoing polymers may contain from about 0.1 to 15 wt % of a non-conjugated diene or triene.

The olefin copolymer or terpolymer is an oil-soluble, linear or branched polymer having a number average molecular weight from about 20,000 to 500,000 g/mol as determined by gel permeation chromatography and universal calibration standardization, with a preferred number average molecular weight range of 30,000 to 400,000 g/mol. The terms polymer and copolymer are used generically to encompass ethylene alpha-olefin copolymers, terpolymers or interpolymers. These materials may contain minor amounts of other olefinic monomers so long as the basic characteristics of the ethylene alpha-olefin copolymers are not materially changed.

An ethylenically unsaturated carboxylic acid material is next grafted onto the prescribed copolymer to form an acylated ethylene copolymer. These carboxylic reactants, which are suitable for grafting onto the copolymer, contain at least one ethylenic bond and at least one, preferably two, carboxylic acid or its anhydride groups or a polar group, which is convertible into said carboxyl groups by oxidation or hydrolysis. Preferably, the carboxylic reactants are selected from the group consisting of acrylic, methacrylic, cinnamic, crotonic, maleic, fumaric and itaconic reactants. More preferably, the carboxylic reactants are selected from the group consisting of maleic acid, fumaric acid, maleic anhydride, or a mixture of two or more of these. Maleic anhydride or a derivative thereof is generally most preferred due to its commercial availability and ease of reaction. In the case of unsaturated copolymers or terpolymers, itaconic acid or its anhydride is preferred due to its reduced tendency to form a crosslinked structure during the free-radical grafting process.

The ethylenically unsaturated carboxylic acid materials typically can provide one or two carboxylic groups per mole of reactant to the grafted polymer. That is, methyl methacrylate can provide one carboxylic group per molecule to the grafted polymer while maleic anhydride can provide two carboxylic groups per molecule to the grafted polymer.

The carboxylic reactant is grafted onto the prescribed olefin copolymer in an amount to provide 0.2 to 20, preferably 1 to 6, of said carboxylic acid acylating groups per 1000 C atoms of said olefin copolymer. The minimum level of functionality is the level needed to achieve the minimum satisfactory dispersancy performance. This minimum performance is reached when on average less than one functional group is present per polymer chain. Above the maximum functionality level little, if any, additional dispersancy performance is noted and other properties such as bulk viscosity and solubility of the additive may be adversely affected.

The grafting reaction to form the acylated olefin copolymers is carried out in a first step (A) by reacting an olefin copolymer with an olefinic carboxylic acid acylating agent, said process comprising heating said olefin copolymer to a molten condition at a temperature in the range of 60° C. to 240° C., grafting, in a first extruder or a first mixing device, said olefinic carboxylic acylating agent onto said copolymer, optionally subsequently reducing the molecular weight of said copolymer at a temperature in the range from 250° C. to 350° C., thereby producing a grafted, reduced molecular weight acylated copolymer having a number average molecular weight ranging from 5,000 to 80,000 g/mol and having between 0.2 to 20 of said carboxylic acid acylating agent grafted per 1000 C atoms of said olefin copolymer. The resulting polymer intermediate is characterized by having carboxylic acid acylating functionality randomly within its structure.

In the process for forming the acylated olefin copolymers, the olefin copolymer is fed to rubber or plastic processing equipment such as an extruder, intensive mixer or masticator, heated to a temperature of 60° C. to 240° C. and the ethylenically unsaturated carboxylic acid reagent and free-radical initiator are separately co-fed to the molten polymer to effect grafting. The processing equipment is generally vented from unreacted reagents and byproducts of the grafting reaction. The residence time in the processing equipment is sufficient to provide for the desired degree of acylation and to allow for purification of the acylated copolymer via venting.

The free-radical initiators which may be used to graft the ethylenically unsaturated carboxylic acid material to the olefin copolymer include peroxides, hydroperoxides, peresters, and also azo compounds and preferably those which decompose thermally to a substantial extent within the grafting temperature range and time to provide free radicals. Representatives of these free-radical initiators are azobutyronitrile, dicumyl peroxide, 2,5-dimethylhexane-2,5-bis-tertiarybutyl peroxide, 2,5-dimethylhex-3-yne-2,5-bis-tertiary-butyl peroxide and di-tertiarybutyl peroxide. The initiator is used in an amount of between about 0.005% and about 1% by weight based on the weight of the reaction mixture.

Other methods known in the art for effecting reaction of ethylene alpha-olefin copolymers with ethylenically unsaturated carboxylic reagents, such as halogenation reactions, thermal or "ene" reactions or mixtures thereof, can be used instead of the free-radical grafting process. Such reactions are conveniently carried out in mineral oil or bulk by heating the reactants at temperatures of 60° C. to 240° C. under an inert atmosphere to avoid the generation of free radicals and oxidation byproducts. "Ene" reactions are a preferred method of grafting when the ethylene-olefin copolymer contains unsaturation. To achieve the high graft levels (up to 20 molecules of the acylating agent per 1000 C atoms of the olefin copolymer) desired by this invention it may be necessary to follow or precede the "ene" or thermal graft reaction with a free-radical graft reaction.

Next, in a second step, the polymer intermediate possessing carboxylic acid acylating functions made in (A) is reacted in a second extruder or a second mixing device with a polyamine compound selected from the group consisting of:

(a) an N-arylphenylenediamine represented by the formula:

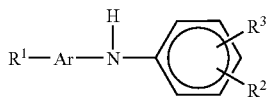

in which Ar is aromatic and $R^1$ is —H, —NH$_2$, —(—NH-Aryl)$_n$-H, —NH-arylalkyl, a branched or straight chain radical having from 4 to 24 carbon atoms that can be alkyl, alkenyl, alkoxyl, aralkyl, alkaryl, hydroxyalkyl or aminoalkyl, $R^2$ is (—NH$_2$, —(NH(CH$_2$)$_n$—)$_m$—NH$_2$, -aryl-NH$_2$, in which n and m have a value from 1 to 10, and $R^3$ is hydrogen, alkyl, alkenyl, alkoxyl, aralkyl, alkaryl having from 4 to 24 carbon atoms, preferably $R^1$=H, $R^2$=NH$_2$, and $R^3$=H, which is N-phenyl para phenylene diamine (NPPDA) and its isomers.

(b) an aminocarbazole represented by the formula:

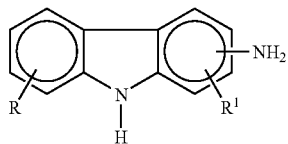

in which R and $R^1$ represent hydrogen or an alkyl, alkenyl, or alkoxyl radical having from 1 to 14 carbon atoms, (c) an aminoindole represented by the formula:

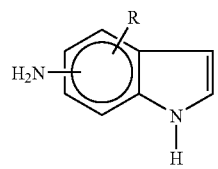

in which R represents hydrogen or an alkyl radical having from 1 to 14 carbon atoms, (d) an amino-indazolinone represented by the formula:

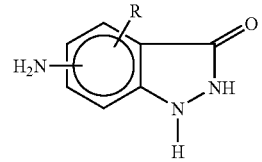

in which R is hydrogen or an alkyl radical having from 1 to 14 carbon atoms, (e) an aminomercaptotriazole represented by the formula:

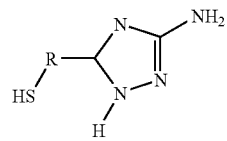

in which R can be absent or can be $C_1$-$C_{10}$ linear or branched hydrocarbon selected from the group consisting of alkyl, aryl, alkaryl, or arylalkyl.

(f) an aminopyrimidine represented by the formula:

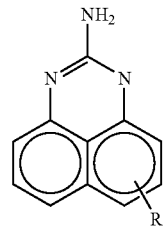

in which R represents hydrogen or an alkyl or alkoxyl radical having from 1 to 14 carbon atoms.

Particularly preferred polyamines for use in the present invention are the N-arylphenylenediamines, more specifically the N-phenylphenylenediamines, for example N-phenyl-1,4-phenylenediamine, N-phenyl-1,3-phenylenediamine, and N-phenyl-1,2-phenylenediamine.

It is preferred that the polyamines contain only one primary amine group so as to avoid coupling and/or gelling of the olefin copolymers upon reaction of said diamine in the form of a crosslinker.

Addition of the polyamine will provide a chemical link between the polyamine and the acylated copolymer via an amide group in the case of a mono acyl acylating agent.

A preferred embodiment of the invention consists of the coupling of the described primary amine with a diacid acylating agent or derivative thereof. Coupling of the acylated polymer will initially proceed via the formation of an amic acid species. This functionality is generally known to be temperature and moisture sensitive resulting in both cases in the liberation of the polyamine and is thus undesired for the application. Characteristic of the reactivity of a primary amine and the described diacid acylating agent or derivatives thereof is that the amic acid intermediate can provide a thermally and hydrolysis stable imide linking functionality by liberation of reaction water. This imide formation is the preferred result of the process. All other above-mentioned components might be present to some extent in the reaction product.

The second step of the process of the invention is preferably carried out in the presence of an acid. With the process of the invention the incomplete amidized or imidized functionalized groups have been reduced by about 75%. Preferably the acid has a pKa<4. The pKa is defined as measured in an aqueous solution at a temperature of 20° C.

Acids used in the process of the invention can be but are not limited to para toluene sulfonic acid (PTSA), n-dodecyl benzene sulfonic acid (DBSA), methane sulfonic acid ($MeSO_3H$) or sulfuric acid ($H_2SO_4$), trifluoro acetic acid ($CF_3CO_2H$), stannous chloride ($SnCl_2$), aluminum chloride ($AlCl_3$). Preferably, the reaction in the process of the invention is carried out in the presence of PTSA or DBSA.

The amount of acid used is preferably between 1 and 3 mol % based on the amount of the polyamine. Below 1 mol % the acid has hardly any effect on the conversion of the anhydride groups to imide groups, while quantities above 4 mol % have turned out to be of little added value.

The process of the invention can be carried out in one or more sections, which may be carried out in the following devices: a feeding extruder (1), a grafting extruder (2) for the graft reaction between an olefin copolymer with an olefinic carboxylic acid acylating agent in which optionally the molecular weight may be reduced, a reactor device (3) for the reaction of the functionalized acylated polymer with a polyamine compound, a degassing and finishing extruder (4), which may be followed by a pelletizer (5).

The feeding extruder (1) may be an extruder for rubber bales such as a conical twin-screw extruder headed by a gear pump, or a feeding extruder for rubber strips, or a feeding extruder for crumbs or pellets. The feeding zone has been designed to transport and melt and pump the polymer to the second part of the process e.g. reactive extruder. Optionally, a second zone of the feeding extruder can also be used as a water-degassing zone.

In the water-degassing zone the polymer can be degassed to an amount of water preferably less than 0.5 wt %. The degassing zone can also be a first zone of the extruder used to carry out the grafting and down-shearing reactions.

The second extruder contains a grafting zone where the grafting reaction takes place, optionally followed by a molecular weight reduction. Injection of the acylating agent and the peroxide generally takes place in this grafting zone. Optionally, multiple injection of acylating agent and peroxide is applied. The acylating agent and the peroxide can be injected into the molten polymer as a melt, as a solution or as a suspension in a volatile solvent or mineral oil. Preferably, the addition of the peroxide would follow the acylating agent addition after 1 to 4 screw diameters to allow sufficient dispersion of the acylating agent.

In a preferred embodiment the addition of acylating agent and peroxide is repeated at least once at a further extruder zone. This multiple injection of reactants will allow an easier dispersion of the polar reactants in the polymer melt and increase graft efficiency, reduce the amount of byproducts, as well as improve the color of the final product. Optionally, only the peroxide is injected in multiple places in the reaction zones. In the case of multiple injections the individual amounts of injected reactant are chosen to represent even or uneven portions of the total amount of reactant.

The length of the grafting zone is chosen to allow the peroxide to decompose substantially resulting in the highest grafting efficiencies. In case of multiple injections of the reactants the grafting section will obviously be extended to fulfill the requirement of peroxide decomposition and consumption of graft monomer. Alternatively, the temperature of the grafting zone can be raised to some extent to allow faster decomposition of the added peroxide.

The temperature in the grafting zone is monitored by means of a thermocouple mounted in the polymer melt. The temperature profile can be installed by means of the resistance of flow caused by typical screw elements in the grafting zone and by adjusting the screw rpms.

The grafted polymer may be transported from the grafting zone through an optional restrictive dam into a purification zone, which is a region where solvent, unreacted reagents, by-products, co-products and other volatile impurities from the reaction are removed from the polymer. One preferred means of purifying the polymer is through use of a vent zone. Such vent zone comprises one or more vents with optional vacuum systems to reduce pressure and assist in the stripping of the volatiles and/or solvents. In the case of multiple vents within a vent zone, the vents are separated from each other by restrictive dams similar to those described above. Use of the vacuum system helps to lower the boiling point of the volatile impurities and facilitates their removal.

To further assist the removal or stripping of unreacted reactants, by-products and co-products, the vents may be under reduced pressure and an inert stripping agent, such as nitrogen, may be introduced. The use of nitrogen stripping is particularly helpful in the removal of low molecular weight materials and lowers the vapor phase partial pressure and improves mass transport.

Optionally, the purification zone can be operated at increased temperature by means of more severe screw elements. Beside the improvement of the purification capability by the higher melt temperature this will allow an optional reduction of the molecular weight of the functional polymer by the means of thermal and mechanical degradation.

The obtained modified melt is transported by conveying elements at the head of the extruder to a reactor device (3) for the reaction of the functionalized acylated polymer with a polyamine compound. A connecting piece may be provided between the grafting extruder and the reactor device especially when the section of the extruder and reactor device to be connected differ in shape or surface. The reactor device can be a second extruder or a passively mixed unit such as a static mixer.

If the reactor device is a static mixer the preceding extruder will be equipped for adequate pressure with a pumping section to build-up transportation of the melt through the passively mixed reactor. In this case the polymer melt can be pumped through the reactor device at a very low pressure drop over the reactor device, making use of a very small pumping zone at the head of the grafting extruder at a sufficiently high extruder torque. This is possible because of the very low viscosity of the polymer, which has been down-sheared in the reaction zone and increased in temperature in the second reaction zone.

The polyamine and the optional acid will be dosed to the acylated polymer melt at the beginning of the reactor device, in which the reactants and the acylated functionalized melt are mixed and the imidization reaction takes place. The dosing of the reactants can be combined or separate, as a melt, solution or suspension in solvents or oil.

A preferred embodiment of the present process consists of injecting the polyamine just before the second mixing device. Injection can take place at the last barrel of the extruder, where at the point of addition part of the pressure-building transport elements are substituted by severe mixing elements to improve dispersion of the reactants. Alternatively, the reactants are added at the entrance of a severe mixing device placed between the extruder and the reactor device to generate molecular dispersion of the amine within the polymer melt.

The temperature at the point of amine addition is monitored by means of a thermocouple mounted in the polymer melt. Addition of the acid can take place before, simultaneously or after the polyamine addition, optionally as a solution or suspension in water, solvent or oil.

The temperature profile is established by means of an adjustable resistance of flow caused by typical screw elements in this reaction zone.

In one embodiment of the invention a surfactant is used to solubilize the amine. Surfactants include but are not limited to those characterized as having (a) solubility characteristics compatible with mineral or synthetic lubricating oil, (b) boiling point and vapor pressure characteristics so as not to greatly lower the flash point of the oil and (c) polarity suitable for solubilizing the polyamine(s). A suitable class of such surfactants includes the reaction products of aliphatic and aromatic hydroxy compounds with ethylene oxide, propylene oxide or mixtures thereof. Such surfactants are commonly known as aliphatic or phenolic alkoxylates. Representative examples are SURFONIC® N-40, N-60, L-24-5, L-24-2, L-46-7 (Huntsman Chemical Company), Neodol® 23-5 and 25-7 (Shell Chemical Company) and Tergitol® surfactants (Union Carbide). Preferred surfactants include those surfactants that contain a functional group, e.g., —OH, capable of reacting with the acylated olefin copolymer.

Another category of surfactants as described above is represented by derivatives of oil soluble acids (e.g. fatty acids) with polyalcohols. Typical examples of such compounds are glycerol monooleate and glycerol monostearate.

The quantity of surfactant used depends in part on its ability to solubilize the polyamine. Typically, concentrations of up to 40 wt % polyamine in surfactant are employed.

The second reactor device should have a mean residence time to allow substantial conversion of the acylated polymer and the polyamine. In general reaction between the acylated polymer and a polyamine to form an amide is fast, whereas the conversion to the imide species will require longer residence times.

In a preferred embodiment the second reactor is operated to simulate as closely as possible a plug flow reactor. Broad residence time distribution is to be avoided since this can result in a broad distribution of the targeted reaction product in the polymer melt. Such plug flow residence pattern is for example obtained by the use of static mixing elements as obtained from Sulzer ltd, Winterthur, Switzerland under the trade name of SMX. Such plug flow-simulating conditions can be described as the relationship between the residence time and the polymer fraction. A typical value is that 95% of the polymer melt would exit the mixing device between 75 and 175% of the mean residence time.

The desired average residence time in the second reaction zone can be reached in various ways. One way of achieving the desired average residence time is to choose a sufficiently large distance between the injection port and the degassing location. It is also possible, for instance, to obtain the desired average residence time by means of the flow rate setting. To achieve a high conversion of the polyamine, a high residence time has to be chosen. Preferably, a residence time of 4-10 minutes is chosen. With such a long residence time, a combination of an extruder with a high volume static mixer is preferably used for carrying out the process of the invention.

The polymer melt in the second reaction zone preferably has a temperature of between 250 and 320° C. For temperatures below 250° C., an excessively high melt viscosity will result in high torques and will negatively influence the reactivity of the melt. A temperature above 320° C. should be avoided as this might cause substantial degradation of the polymer. More preferably, the temperature in the second reaction zone is between 275 and 290° C., while the temperature of the material exiting the dye is preferably between 290 and 310° C. Degradation of the polymer can be promoted to a certain extent, by variation of temperature and shear for the production of lower MW derivatives.

The product from the second reactor device is discharged into a connected finishing extruder, which devolatilizes the functionalized polymer product and, if desired, mixes the polymer product with any additional additives. The finishing extruder is provided with an inlet port for receiving polymer from the reactor device. The inlet port is preferably situated between the devolatilization port and the extruder exit.

If desired additional injection ports may be provided along the length of the finishing extruder for the injection of other additives. Such additives will be chosen according to its beneficial properties on the functional polymer itself or its oil solution. Useful additives are those that stabilize the functional polymer obtained by the process or to its resulting oil solutions with respect to color, shelf life stability, viscosity stability, etc.

In a preferred embodiment of the invention an aldehyde, ketone or other amine reactive additive is added at the finishing extruder. This additive will allow the further reduction of free polyamine by formation of imines or amides. Reduction of the residual amine levels is preferred to reduce unwanted interference of the amine with engine parts as well as to avoid discoloration that might occur by the use of aromatic amines. Preferred additives are high boiling aldehydes, ketones, anhydrides or acids.

Another embodiment of this invention consists of the discrete addition of above-mentioned surfactants at the finishing extruder instead of or in addition to their use as amine solvent discussed above, such that the total amount of surfactant in the finished additive is 10 wt % or less.

The finishing extruder will allow the building up of sufficient pressure to extrude the polymer through a die to be cut by an underwater pelletizer. Other exit media such as a turbulator, a strand bath or a gear pump may be used. In applications in which rapid cooling of the product is desired, an underwater pelletizer is preferred.

The invention further relates to a highly grafted, multi-functional olefin copolymer, prepared by the process of the invention, further comprising between 0.2 and 20 functional groups per 1000 C atoms, the functional groups consisting of amide or imide groups, characterized in that the ratio of the amide or imide groups with respect to the functional groups is more than 0.85, preferably more than 0.90 and most preferably more than 0.95.

The highly grafted, multi-functional olefin copolymers of the present invention can be incorporated into lubricating oil in any convenient way. Thus, the highly grafted, multi-functional olefin copolymers can be added directly to the lubricating oil by dispersing or dissolving the same in the lubricating oil at the desired level of concentration. Such blending into the lubricating oil can occur at room temperature or elevated temperatures. Optionally, a portion of the oil or other additives can be added at the finishing extruder to improve the later solubilization process. Alternatively, the highly grafted, multi-functional olefin copolymers can be blended with a suitable oil-soluble solvent/diluent (such as benzene, xylene, toluene, lubricating base oils and petroleum distillates) to form a concentrate, and then the concentrate can be blended with a lubricating oil to obtain the final formulation. Such additive concentrates will typically contain (on an active ingredient basis) from about 3 to about 45 wt %, and preferably from about 10 to about 35 wt %, highly grafted, multi-functional olefin copolymer additive, and typically from about 20 to 70 wt %, preferably from about 65 to 90 wt %, base oil based on the concentrate weight.

The highly grafted, multi-functional olefin copolymer products of the present invention find their primary utility in lubricating oil compositions, which employ a base oil in which the additives are dissolved or dispersed. Such base oils may be natural, synthetic or mixtures thereof. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additive mixtures of the present invention in base oils conventionally employed in and/or adapted for use as power transmitting fluids, heavy duty hydraulic fluids, power steering fluids and the like. Gear lubricants, industrial oils, pump oils and other lubricating oil compositions can also benefit from the incorporation therein of the additive mixtures of the present invention.

These lubricating oil formulations conventionally contain additional additives that will supply the characteristics that are required in the formulations. Among these types of additives are included additional viscosity index improvers, antioxidants, corrosion inhibitors, detergents, dispersants, pour point depressants, antiwear agents, antifoamants, demulsifiers and friction modifiers.

In the preparation of lubricating oil formulations it is common practice to introduce the additives in the form of 10 to 80 wt % active ingredient concentrates in hydrocarbon oil, e.g. mineral lubricating oil, or other suitable solvent. Usually these concentrates may be diluted with 3 to 100, e.g., 5 to 40, parts by weight of lubricating oil per part by weight of the additive package in forming finished lubricants, e.g. crankcase motor oils. The purpose of concentrates, of course, is to make the handling of the various materials less difficult and awkward as well as to facilitate solution or dispersion in the final blend. Thus, the highly grafted, multi-functional olefin copolymer would usually be employed in the form of a 10 to 50 wt % concentrate, for example, in a lubricating oil fraction.

The highly grafted, multi-functional olefin copolymers of the present invention will generally be used in admixture with a lube oil base stock, comprising an oil of lubricating viscosity, including natural lubricating oils, synthetic lubricating oils and mixtures thereof.

Natural oils include animal oils and vegetable oils (e.g., castor, lard oil), liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. The synthetic lubricating oils used in this invention include one of any number of commonly used synthetic hydrocarbon oils, which include, but are not limited to, poly-alpha-olefins, alkylated aromatics, alkylene oxide polymers, interpolymers, copolymers and derivatives thereof. Here the terminal hydroxyl groups have been modified by esterification, etherification etc, esters of dicarboxylic acids and silicon-based oils.

The present invention is further directed to a method of improving fuel economy and fuel economy durability of a vehicle wherein said method comprises adding to and operating in the crankcase of the vehicle the lubricating oil composition described above.

Also, a method of extending lubricant drain intervals in a vehicle is contemplated. Said method comprises adding to and operating in the crankcase of the vehicle the lubricating oil composition described above.

A method of improving the low temperature properties of lubricating oil is also contemplated. Said method comprises combining an oil of lubricating viscosity and the highly grafted, multi-functional olefin copolymer described above.

The highly grafted, multi-functional olefin copolymers of the present invention may be post-treated so as to impart additional properties necessary or desired for a specific lubricant application. Post-treatment techniques are well known in the art and include boronation, phosphorylation, and maleination.

SHORT DESCRIPTION OF THE FIGURE

FIG. 1 shows a preferred arrangement for carrying out the process of the invention.

DETAILED DESCRIPTION OF THE PREFERRED EMBODIMENT

FIG. 1 shows an arrangement of a grafting extruder (2) and a static mixing device (3). A feeding extruder (1) comprises a unit for grinding and dosing bales (10) to a single conical extruder (11) headed with a gear pump (12), capable of delivering a melt at 110-120° C. to a side feed (20) of a grafting extruder (a ZE 60A×58D UTX twin-screw extruder from Berstorff) with a diameter of 60 mm and an L/D ratio of 58.

The grafting extruder comprises the following zones:
1. A transportation, heating and pressure build up zone (20) with an L/D=10.
2. A degassing zone (21) to remove volatiles of EP-rubber, mainly water, up to a level of less than 0.5% with an L/D=6.
3. A first injection (22a) and mixing zone for the acylating agent, with an L/D of 3.
4. A first injection (23a) and mixing zone for peroxide, with an L/D=4.
5. A first temperature measurement zone (24) comprising a sword thermocouple in melt with an L/D of 1.
6. A first transportation, reaction and pressure build up zone with an L/D=3.
7. A second injection (22b) and mixing zone for the acylating agent with an L/D of 3.
8. A second injection (23b) and mixing zone for peroxide, with an L/D of 4.
9. A second transportation, reaction and pressure build up zone with an L/D of 3.
10. A degassing zone (25) to remove unreacted peroxide, acylating agent and other volatiles with an L/D of 10.
11. A valve for sampling the acylated copolymer melt (26).
12. A zone wherein at two separated feeding blocks (27) the polyamine compound and optionally the acid can be dosed, mixed and reacted with an L/D of 5.
13. A second temperature measurement zone comprising a sword thermocouple (28) in the melt with an L/D of 1.

14. A third transportation and pressure build up zone with an L/D of 5 (29).

A valve (30) between the twin-screw extruder (2) and the second reactor (3), which is an SMX reactor mixing device (DN150 from Sulzer), with 7 mixing elements, a length of 1.4 meter, a diameter of 150 mm, and a content of 21 liters.

The static mixer is followed by a second twin screw extruder (4) comprising a transportation zone, a pressure build-up zone, which is followed by a degassing zone (41) for devolatization of water, residual polyamine and other volatiles and a last zone (42) for adding and mixing of specified additives necessary for oil additive recipes. A second valve (30b) separates the degassing extruder from the pelletizer (5), which extruder is provided with an underwater pelletizing system.

The invention is further elucidated with the following examples.

Example 1

Bales of rubber (Keltan 3200A, a product from DSM Elastomers, 49 wt % of ethylene and 51 wt % of propylene with a number average molecular weight of 120 kg/mol), were stripped of film wrap and fed to an extruder arrangement according to FIG. 1 at a feed rate of 200 kg/h. The screw of the ZE 60A was relatively weak by a preferred use of transport and neutral mixing or kneading elements. Molten maleic anhydride (80° C.) was fed at the dosing points (22a, 22b) at a combined feed rate of 3.0% of the rubber throughput. A 30% solution of peroxide (Akzo Nobel, Trigonox B) in mineral oil was fed at the dosing points (23a, 23b) at a combined rate of 0.4% of the rubber throughput. Screw speed was 225 rpm to reach a reaction melt temperature of 230° C. measured by the melt thermocouple (24). Degassing of unreacted product was done via the vent zone (25) at a vacuum of 200 mbar.

NPPDA was dosed at a first injection point 27, as a melt at 100° C. at a rate of 8.0 kg/hour and subsequently transferred to the static mixer (3).

A solution of 25% PTSA in THF was dosed at a second injection point (27) at a rate of 150 g/hour PTSA.

The temperature after amine and PTSA dosing at the thermocouple (28) was determined to be 290° C. The barrel temperature of the static mixer (3) was accordingly set at 300° C. to avoid cooling of the polymer stream and fowling of the polymer melt at the colder surface of the static mixer.

The finishing extruder (4) was a short 65 mm single screw extruder with a high vacuum applied at the venting port (41) of the machine. 0.5 wt % pelargonic aldehyde was added at the dosing point 42. The temperature was maintained at 300° C. The polymer melt exiting the extruder was fed to an underwater pelletizer system (5) including a pelletizing head with a star knife assembly and water recirculation system with heat exchanger.

The additive composition obtained was a clear orange and gel free polymer with a melt flow index of 1.98 g/10 min (190° C., 2160 g).

The level of functionalization of the polymer melt is determined after thorough purification by means of precipitation followed by elemental analysis. The bound nitrogen level of 0.52% of the purified sample can be converted to a functionality level of 2.6 per 1000 carbon atoms. Alternatively the level of functionality has been determined by FTIR, following the absorption intensity of the representative peak for the NPPDA succinimide at 1598 cm$^{-1}$, normalized against the EPM backbone absorption at 722 cm$^{-1}$.

Conversion of the maleic anhydride functionality toward the imide was determined to be 96% after intensive drying and evaporation of free and amide-bound NPPDA by FTIR, following the absorption intensity of a representative anhydride peak at 1860 cm$^{-1}$, normalized against the EPM backbone absorption at 722 cm$^{-1}$.

The total residual NPPDA and NPPDA bound as amide acid measured by standard chromatographic methods was determined to be 900 ppm. Further low temperature gel permeation chromatography confirmed expected molecular weight reduction to Mn 39,000 g/mol at an MWD of 1.9.

Comparative Experiment A

The process was performed under nearly identical conditions as described in example 1 with the major difference of the adjustment to an increased melt temperature in the maleic anhydride-grafting zone by means of a slightly increased screw severity (e.g. replacement transport with kneading elements). Melt temperature, measured by the melt thermocouple (24) was 254° C. Also in this experiment the additive composition obtained was a clear orange polymer. The texture of the cold sample indicated the presence of gels. This was confirmed by solubility in THF followed by filtration through a 25 micron filter resulting in a gel content of 3.4%. The melt flow index was not determined because of the presence of gels.

The level of functionalization was determined as described in example 1. The bound nitrogen level of 0.32% indicates a functionality level of 1.6 per 1000 carbon atoms.

Conversion of the maleic anhydride functionality toward the imide was determined to be 97% after intensive drying and evaporation of free and amide-bound NPPDA by FTIR.

It is clear that the formation of gel as well as the low grafting yield are unacceptable and unwanted in the present invention.

Example 2

The process was performed under identical conditions as described in example 1. The only difference is that no PTSA was dosed at the second injection point (27).

Also in this case the sample obtained was a clear orange and gel free polymer with a melt flow index of 2.1 g/10 min (190° C., 2160 g).

The level of functionalization of the polymer melt is determined after thorough purification by means of precipitation followed by elemental analysis. The bound nitrogen level of 0.42% of the purified sample can be converted to a functionality level of 2.1 per 1000 C.

Conversion of the maleic anhydride functionality toward the imide was determined to be 79% after intensive drying and evaporation of free and amide-bound NPPDA by FTIR, following the absorption intensity of a representative anhydride peak at 1860 cm$^{-1}$, normalized against the EPM backbone absorption at 722 cm$^{-1}$.

The total residual NPPDA and NPPDA bound as amide acid measured by standard chromatographic methods was determined to be 3500 ppm.

Though this level of functionality is acceptable and within the scope of the present invention it is clear that the reduced level of bound nitrogen is due to a lowered conversion of the anhydride species to the imide species.

Example 3

The process was performed under identical conditions as described in example 1. Addition of reactive monomer as well as peroxide was halved and reduced to a single addition of each maleic anhydride and Trigonox B of 1.5% and 0.2% respectively at the first set of valves (22a, 23a). The second set of valves (22b, 23b) were blinded for this experiment. The dosage of amine was reduced in consequence to 4.0 kg/hour at dosing point 27.

Also in this case the sample obtained was a clear orange and gel free polymer with a melt flow index of 3.2 g/10 min (190° C., 2160 g).

The level of functionalization of the polymer melt is determined after thorough purification by means of precipitation followed by elemental analysis. The bound nitrogen level of 0.25% of the purified sample can be converted to a functionality level of 1.3 per 1000 carbon atoms.

Conversion of the maleic anhydride functionality toward the imide was determined to be 95% after intensive drying and evaporation of free and amide-bound NPPDA by FTIR, following the absorption intensity of a representative anhydride peak at 1860 cm$^{-1}$, normalized against the EPM backbone absorption at 722 cm$^{-1}$.

The total residual NPPDA and NPPDA bound as amide acid measured by standard chromatographic methods was determined to be 500 ppm.

The invention claimed is:

1. A process for the preparation of a highly grafted, multi-functional olefin copolymer prepared by the steps comprising:

(A) reacting an olefin copolymer of ethylene and at least one $C_3$ to $C_{23}$ α-olefin and, optionally, a polyene selected from non-conjugated dienes and trienes comprising from about 15 to 80 mole percent of ethylene, from about 20 to 85 mole percent of said $C_3$ to $C_{23}$ α-olefin and from about 0 to 15 wt percent of said polyene, said copolymer having a number average molecular weight ranging from 1,000 to 500,000, with an olefinic carboxylic acid acylating agent, said process comprising, (i) heating said copolymer to a molten condition at a temperature in the range of 60° C. to 240° C. to form a melt of the copolymer, (ii) transferring the melt of the copolymer to a first extruder, and (iii) grafting, in the first extruder, said olefinic carboxylic acylating agent onto said copolymer thereby producing a melt flow of grafted acylated copolymer having a number average molecular weight ranging from 1,000 to 80,000 and having at least 0.2-20 molecules of said carboxylic acid acylating agent grafted per 1000 C atoms of said olefin copolymer, and (iv) degassing the melt flow of acylated copolymer in a purification zone of the first extruder to remove unreacted components and other volatiles therefrom so as to obtain a purified melt flow of acylated copolymer, (B) transferring the purified melt flow of acylated copolymer produced in step (A) to a second extruder; and (C) reacting, in the second extruder, said melt flow of acylated copolymer produced in step (A) in the presence of an acid with a polyamine compound to form the highly grafted, multi-functional olefin copolymer, wherein the polyamine is at least one selected from the group consisting of:

(a) an N-arylphenylenediamine represented by the formula:

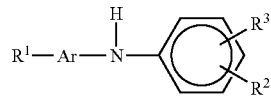

in which Ar is aromatic and $R^1$ is —H, —NH$_2$, —(—NH-Aryl)$_n$-H, —(—NH-Alkyl)$_n$-H, —NH-arylalkyl, a branched or straight chain radical having from 4 to 24 carbon atoms that can be alkyl, alkenyl, alkoxyl, aralkyl, alkaryl, hydroxyalkyl or aminoalkyl, $R^2$ is (—NH$_2$, —(NH(CH$_2$)$_n$—)$_m$—NH$_2$, —(CH$_2$)$_n$—NH$_2$, -aryl-NH$_2$, in which n and m has a value from 1 to 10, and $R^3$ is hydrogen, alkyl, alkenyl, alkoxyl, aralkyl, alkaryl having from 4 to 24 carbon atoms, preferably $R^1$=H, $R^2$=—NH$_2$, and $R^3$=H, which is N-phenyl para phenylene diamine (NPPDA) and its isomers, (b) an aminocarbazole represented by the formula:

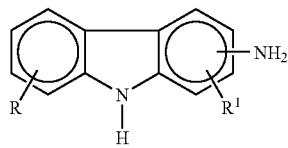

in which R and $R^1$ represent hydrogen or an alkyl, alkenyl, or alkoxyl radical having from 1 to 14 carbon atoms, (c) an aminoindole represented by the formula:

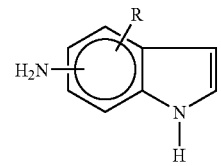

in which R represents hydrogen or an alkyl radical having from 1 to 14 carbon atoms, (d) an amino-indazolinone represented by the formula;

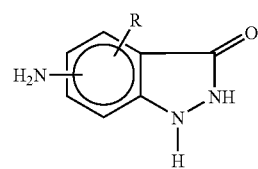

in which R is hydrogen or an alkyl radical having from 1 to 14 carbon atoms, (e) an aminomercaptotriazole represented by the formula:

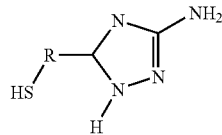

in which R can be absent or can be a $C_1$-$C_{10}$ linear or branched hydrocarbon selected from the group consisting of alkyl, aryl, alkaryl, or arylalkyl, (f) an aminopyrimidine represented by the formula:

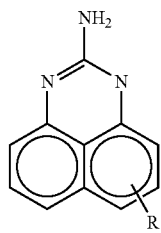

in which R represents hydrogen or an alkyl or alkoxyl radical having from 1 to 14 carbon atoms.

2. The process as claimed in claim 1, wherein the acid has a pKa<4.

3. The process as claimed in claim 2, wherein the acid is toluene sulfonic acid (PTSA) or n-dodecyl benzene sulfonic acid (DBSA).

4. The process as claimed in claim 3, wherein the amount of PTSA is between 1 and 3 mol % based on the polyamine.

5. The process as claimed claim 1, wherein the first extruder is a twin-screw extruder, and wherein the process comprises transferring the melt flow of the acylated copolymer to a static mixer device positioned between the first and second extruders, wherein the process comprises heating the static mixer device to a temperature sufficient to maintain the melt flow of the acylated copolymer mixed therein and discharged to the second extruder.

6. The process as claimed in claim 5, which further comprises degassing the melt flow of the acylated copolymer discharged from the static mixer device by means of an extruder.

7. The process as claimed in claim 1, wherein the molar ratio between the polyamine compound and the acylating agent is between 0.9 and 1.2.

8. The process as claimed in claim 5, wherein the temperature of the reaction mixture in the static mixer device is at least 275° C.

9. A highly grafted, multi-functional olefin copolymer, prepared by the process of claim 1, further comprising between 0.2 and 20 functional groups per 1000 C atoms, the functional groups consisting of amide or imide groups, characterized in that the ratio of the amide or imide groups with respect to the functional groups is more than 0.85.

10. A lubricating oil composition comprising a major amount of an oil of lubricating viscosity and a minor amount of the highly grafted, multi-functional olefin copolymer of claim 9.

11. The lubricating oil composition of claim 10, further comprising at least one additive selected from the group consisting of additional viscosity index improvers, antioxidants, corrosion inhibitors, detergents, dispersants, pour point depressants, antiwear agents, antifoamants, demulsifiers and friction modifiers.

12. The lubricating oil composition of claim 10, wherein the oil of lubricating viscosity is selected from the group consisting of natural oils, synthetic oils and mixtures thereof.

13. The lubricating oil composition as claimed in claim 10, wherein the amount of a low molecular weight polyamine comprising compound in the oil is smaller than 50 ppm.

14. A method of improving fuel economy of a vehicle wherein said method comprises adding to and operating in the crankcase of the vehicle the lubricating oil composition of claim 10.

15. A method of improving durability of a vehicle wherein said method comprises adding to and operating in the crankcase of the vehicle the lubricating oil composition of claim 10.

16. A method of extending lubricant drain intervals in a vehicle wherein said method comprises adding to and aerating in the crankcase of the vehicle the lubricating oil composition of claim 10.

17. A method of improving the low temperature properties of a lubricating oil, said method comprising combining an oil of lubricating viscosity and the highly grafted, multi-functional olefin copolymer of claim 9.

18. A method of lubricating an automotive engine wherein said method comprises adding to and operating in the crankcase of said automotive engine the lubricating oil composition of claim 13.

19. The highly grafted, multi-functional olefin copolymer according to claim 9, wherein the ratio of the amide or imide groups with respect to the functional groups is more than 0.90.

20. The highly grafted, multi-functional olefin copolymer according to claim 9, wherein the ratio of the amide or imide groups with respect to the functional groups is more than 0.95.

21. The process as claimed in claim 1, wherein the grafting step (A)(iii) comprises subsequently reducing the molecular weight of said copolymer in the first extruder at a temperature in the range of 250° C. to 350° C. to thereby produce a melt flow of grafted and reduced molecular weight acylated copolymer having a number average molecular weight ranging from 1,000 to 80,000.

* * * * *